(12) United States Patent
Pinnau

(10) Patent No.: US 7,784,621 B2
(45) Date of Patent: Aug. 31, 2010

(54) ULTRAFILTRATION MEMBRANE AND PROCESS

(75) Inventor: Ingo Pinnau, Palo Alto, CA (US)

(73) Assignee: Membrane Technology & Research, Inc, Menlo Park, CA (US)

( * ) Notice: Subject to any disclaimer, the term of this patent is extended or adjusted under 35 U.S.C. 154(b) by 1164 days.

(21) Appl. No.: 10/879,628

(22) Filed: Jun. 29, 2004

(65) Prior Publication Data
US 2005/0284814 A1    Dec. 29, 2005

(51) Int. Cl.
B01D 71/02  (2006.01)
B01D 71/06  (2006.01)
B01D 71/52  (2006.01)
B01D 71/56  (2006.01)
B01D 61/00  (2006.01)

(52) U.S. Cl. .................. 210/510.1; 210/650; 210/651; 210/490; 210/500.27; 210/509

(58) Field of Classification Search .......... None
See application file for complete search history.

(56) References Cited

U.S. PATENT DOCUMENTS

| 3,544,358 | A |   | 12/1970 | Manjikian |
|---|---|---|---|---|
| 3,944,658 | A |   | 3/1976 | Yoldas |
| 4,781,831 | A | * | 11/1988 | Goldsmith ............ 210/247 |
| 4,861,480 | A |   | 8/1989 | Berardo et al. |
| 4,874,516 | A |   | 10/1989 | Kondo |
| 4,963,165 | A |   | 10/1990 | Blume et al. |
| 4,983,423 | A |   | 1/1991 | Goldsmith |
| 5,006,248 | A |   | 4/1991 | Anderson et al. |
| 5,066,398 | A |   | 11/1991 | Soria et al. |
| 5,106,502 | A |   | 4/1992 | Goldsmith |
| 5,141,649 | A |   | 8/1992 | Pasternak et al. |
| 5,171,449 | A |   | 12/1992 | Pasternak et al. |
| 5,208,190 | A |   | 5/1993 | Anderson et al. |
| 5,266,207 | A |   | 11/1993 | Boye et al. |
| 5,342,521 | A |   | 8/1994 | Bardot et al. |
| 5,824,220 | A |   | 10/1998 | Grangeon et al. |
| 6,026,968 | A |   | 2/2000 | Hachisuka et al. |
| 6,093,325 | A |   | 7/2000 | Stone |
| 6,440,309 | B1 |   | 8/2002 | Cohen |

FOREIGN PATENT DOCUMENTS

| DE | 4237604 | 5/1994 |
|---|---|---|
| WO | WO03072232 | 9/2003 |

OTHER PUBLICATIONS

Nunes et al, "Dense Hydrophilic Composite Membranes for Ultrafiltration," Journal of Membrane Science, 1995, p. 49-56, v. 106.
Ebert et al, "Solvent Resistant Nanofiltration membranes in Edible Oil Processing," Membrane Technology, Mar. 1999, p. 5-8, v. 1999.

* cited by examiner

Primary Examiner—Krishnan S Menon
(74) Attorney, Agent, or Firm—J. Farrant

(57) ABSTRACT

An inorganic membrane suitable for ultrafiltration or nanofiltration, and methods for making and using the membrane. The membrane has a organic polymer deposited on the feed surface, but is not able to perform separations by solution-diffusion.

1 Claim, 9 Drawing Sheets

ULTRAFILTRATION MEMBRANE AND PROCESS

This invention was made in part with Government support under contract number N00167-03-C-0021, awarded by the Department of the Navy-Naval Surface Warfare Center. The Government has certain rights in this invention.

FIELD OF THE INVENTION

The invention relates to inorganic ultrafiltration membranes and processes. More particularly, the invention relates to inorganic ultrafiltration membranes having a polymer treatment that provides fouling resistance.

BACKGROUND OF THE INVENTION

Separation membranes may be made from various inorganic or organic materials, including ceramics, metals and polymers. Many membranes are asymmetric in structure, and incorporate a finely porous surface layer or skin and a much more open microporous substrate. The finely porous surface layer performs the separation; the microporous substrate provides mechanical strength. Such membranes may be integrally asymmetric, for example polymer membranes made by the Loeb-Sourirajan process, and used for reverse osmosis and gas separation applications, or may be composite structures in which the support and selective layers are formed in separate operations, and made from different materials, for example ceramic composites used for certain ultrafiltration and nanofiltration applications.

Composite membranes that include both inorganic and organic layers have also been proposed for some types of membrane separation application.

U.S. Pat. No. 3,544,358, to Universal Water Corp., describes a reverse osmosis membrane comprising a cellulosic derivative, such as cellulose acetate, applied as a selective layer onto a porous ceramic support.

U.S. Pat. No. 6,093,325, to Bechtel BWXT Idaho, describes a membrane for diffusion dialysis, pervaporation or reverse osmosis separations. The membrane comprises a thin polyphosphazene layer cast onto a porous inorganic or polymer support.

PCT Patent Application WO03/072232 A1, to Creavis Gesellschaft, describes a membrane comprising a ceramic support and an organic polymer selective layer.

U.S. Pat. No. 5,066,398, to Societe Des Ceramiques Techniques, describes a pervaporation membrane comprising a porous inorganic support coated with a continuous separating layer of a polyphosphazene. Penetration of phosphazene into the pores of the support is limited to a depth of less than 5 times the pore diameter.

U.S. Pat. No. 5,266,207, to Techsep, describes ananofiltration membrane comprising aporous inorganic support coated with a selective layer of an elastomeric polyphosphazene.

U.S. Pat. No. 4,861,480, to Commissariat a L'Energie Atomique, describes a reverse osmosis membrane comprising an inorganic porous support coated with a dense, semipermeable layer of poly(vinylidene fluoride) [PVDF]. An ethylenically unsaturated monomer is then grafted onto the PVDF layer, and the resulting membrane is functionalized to give the layer its separation capabilities.

U.S. Pat. Nos. 5,141,649 and 5,171,449, to Texaco, describe pervaporation membranes comprising a non-porous, cross-linked polyvinyl alcohol selective layer formed in situ on a porous ceramic support.

U.S. Pat. No. 6,440,309, to Yoram Cohen, describes a pervaporation membrane comprising a porous ceramic support onto which is graft-polymerized a vinyl lower alkoxysilane.

U.S. Pat. No. 4,874,516, to NGK Insulators, describes a "semi-ultrafiltration" membrane comprising a porous ceramic support coated with a membrane-forming fluorocarbon resin which provides the selective layer and partially permeates the pores of the support.

U.S. Pat. No. 5,342,521, to Commissariat a L'Energie Atomique, describes reverse osmosis or nanofiltration membranes having a porous, inorganic support, an intermediate mesoporous metal oxide layer, and a polymeric selective layer.

In all of the above cases, the ceramic substrate provides mechanical strength and the polymer coating layer is the selective layer that provides and governs the separation or rejection properties.

Many different types of polymers may be used for the selective layer of a membrane. Polyamide-polyether block copolymers have been reported to be useful as selective layers in polymeric gas separation and ultrafiltration membranes, as in U.S. Pat. No. 4,963,165; German patent number DE 4237604; an article by K. Ebert et al., "Solvent resistant nanofiltration membranes in edible oil processing," (*Membrane Technology*, No. 107, p. 5-8, 1999); and an article by S. Nunes et al., "Dense hydrophilic composite membranes for ultrafiltration," (*J. Membrane Science*, Vol. 106, p. 49-56, 1995).

Ultrafiltration is a membrane separation process that uses finely porous membranes to separate water and microsolutes from macromolecules and colloids. Ultrafiltration membranes operate by permeating water and small solutes and rejecting the larger dissolved or suspended materials. A driving force for water permeation is provided by applying an elevated pressure to the feed liquid or a reduced pressure on the permeate side, or both. At least at low pressure, the water flux through the membrane increases with increasing pressure difference across the membrane.

Ultrafiltration membranes are very susceptible to fouling. Fouling occurs when contaminants such as charged solutes, oils, bacteria, colloidal materials of various types, and suspended particulates become trapped on the surface or in the pores of the membrane. In addition to clogging pores, the accreting material forms a thickening gel layer on the membrane surface that presents an increasing resistance to water permeation. Thus, fouling impairs the membrane performance by progressively diminishing the transmembrane flux. For a short time, the increasing resistance presented by the fouling layer can be overcome by increasing the pressure driving force.

To help control membrane fouling, ultrafiltration systems may be designed to include one or more pretreatment steps upstream of the ultrafiltration units. These treatments typically include gravity separation and/or coarser filtration steps to remove potential foulants. In addition, frequent mechanical and/or chemical cleaning procedures are required. Although backflushing and chemical cleaning can remove the surface gel layer reasonably well, they are less successful in removing material trapped inside the membrane pores.

Despite use of the above procedures and operating protocols, fouling continues to be a significant problem in at least some applications and reduces the efficiency of many ultrafiltration processes.

There remains a need for intrinsically less fouling ultrafiltration membranes. If such a need could be filled, wider applications of ultrafiltration and nanofiltration treatment, such as to industrial and oily wastewaters of many types, or for military or naval use, would be possible.

SUMMARY OF THE INVENTION

The invention is a membrane suitable for ultrafiltration, including nanofiltration, and methods for making and using the membrane. The membrane is highly fouling resistant.

The membrane is made from an inorganic material treated by applying an organic polymer deposit to the feed surface.

In a basic embodiment, the membrane comprises an inorganic membrane characterized by the following elements:
(a) before being treated as described in element (b) below, the inorganic membrane has a porous feed surface with an average pore diameter in the range 10-1,000 Å and is able to function as an ultrafiltration or nanofiltration membrane;
(b) the inorganic membrane has been treated by depositing a polymer region on the porous feed surface;
(c) after being treated as described in element (b) above, the inorganic membrane continues to be able to function as an ultrafiltration or nanofiltration membrane but is unable to function as a solution-diffusion gas separation membrane.

The structure of the inorganic membrane may be of any type that provides a finely porous feed surface of a porosity appropriate to operating the membrane as an ultrafiltration or nanofiltration membrane. The average pore diameter on the feed surface is typically and preferably in the range 10-1,000 Å.

Preferably the membrane is a ceramic membrane, such as one made from alumina or other metal oxide. To achieve a sufficiently finely porous feed surface, the membrane is preferably a composite inorganic membrane. Membranes of this type are known in the art and may be made by slip coating or by a sol-gel process, for example. The membrane may be in the form of sheets, tubes, monolithic blocks, capillary fibers or any other convenient form.

After the inorganic membrane has been formed, it has a surface porosity and pore size such that it could be operated without the organic polymer treatment as an ultrafiltration or nanofiltration membrane.

The membrane is treated by applying a very thin coat of a dilute organic polymer solution. This deposit covers or partially covers most of the pore openings.

Unlike coatings that provide the selectivity or separation capability of a membrane, the polymer deposit should not form a dense, continuous, gas-tight layer. If such a layer were to be deposited, it would reduce the water flux of the membrane to an unacceptable level.

Rather, the deposit should be extremely thin, typically no more than between about 0.1 μm and about 0.5 μm thick, and may be discontinuous, so that pinholes, cracks or regions of uncoated inorganic membrane surface remain. Thus, the treatment creates one or multiple regions of polymer deposit on the feed surface, but the deposit is so thin or leaky that the transmembrane water flux remains relatively high.

The thinness or leakiness of the polymer deposit means that, unlike the prior art membranes described above, the polymer deposit does not control the separation properties. Thus, the treated membrane could not perform separations that require a membrane with a dense, essentially continuous and defect-free polymer layer, such as reverse osmosis, pervaporation or gas separation.

Using gas separation as an example of these types of separation, permeating gases dissolve in the polymer material of the dense layer, then diffuse through it. This mechanism is called solution-diffusion and membranes that separate on this principle are called solution-diffusion membranes. The selectivity is determined by the solubility and diffusivity of the gases in the polymer. This selectivity is known for many polymers and gas pairs, and can be measured by simple permeation experiments.

The membranes of the invention are unable to operate in this manner. They exhibit a gas selectivity that is inconsistent with solution-diffusion as the dominant transport mechanism, as explained in more detail below.

The organic polymer used to treat the membranes is preferably hydrophilic, and most preferably is water swellable but water insoluble. When the polymer is water insoluble, crosslinking may not be required after the polymer has been deposited. Preferably the polymer is rubbery, or at least has a rubbery segment.

The treatment is not relied upon to impart ultrafiltration or nanofiltration capability. In general, the rejection properties of the treated membranes are in a similar range to those of an untreated membrane of the same structure and composition.

The treatment typically results in a membrane that exhibits a lower initial water flux than the initial water flux of an untreated membrane of the same structure and composition, if the treated and untreated membranes are challenged with the same feed solution under the same conditions.

However, the treatment also results in membranes that are much less susceptible to fouling than their untreated equivalents when challenged with common contaminants such as oils, or other organic compounds. For example, flux decline, or resistance increase, over a period of hours, days or weeks for the treated membranes may be half or less than would occur with untreated membranes of the same structure and composition. Internal fouling, caused by material trapped inside membrane pores or surface crevices, is believed to be nearly eliminated by the treatment.

The invention further includes methods of making the treated membrane. In this aspect, the invention comprises the following steps:
(a) manufacturing or otherwise providing an inorganic membrane having a feed surface with an average pore diameter in the range about 10-1,000 Å;
(b) preparing a solution of a polymer having a polymer concentration of up to about 0.5 wt % polymer in a solvent;
(c) coating the solution onto the feed surface;
(d) allowing the solvent to evaporate, thereby forming a polymer region on the feed surface; the method being characterized in that after steps (b) and (c) have been performed the inorganic membrane is unable to function as a solution-diffusion gas separation membrane.

The membranes may be made by preparing an inorganic ultrafiltration or nanofiltration membrane according to any convenient technique, then applying the organic polymer treatment as a manufacturing step. The treatment may also be used to improve the properties of already made commercial membranes, preferably before they are used for the first time.

The polymer solution applied to the feed surface is very dilute, such as no more than about 0.5 wt % polymer, preferably no more than about 0.3 wt % polymer, and most preferably no more than about 0.2 wt % polymer or even 0.1 wt % polymer. The solution is applied to the feed surface using any solution coating method familiar in the art. This may be as simple as pouring the solution over the membranes, for example. The membrane is then dried, leaving a polymer deposit on the feed surface.

The invention also includes methods of using the treated membrane. In this aspect, the invention comprises the following steps:
(a) providing an inorganic membrane characterized by the following elements:

(i) before being treated as described in element (ii) below, the inorganic membrane has a porous surface with an average pore diameter in the range 10-1,000 Å and is able to function as an ultrafiltration or nanofiltration membrane;

(ii) the inorganic membrane has been treated by depositing a polymer region on the porous surface;

(iii) after being treated as described in element (ii) above, the inorganic membrane continues to be able to function as an ultrafiltration or nanofiltration membrane but is unable to function as a solution-diffusion gas separation membrane;

(b) passing a feed stream containing a contaminant removable by ultrafiltration across the feed side under filtration conditions;

(c) removing from the permeate side a treated water stream depleted in the contaminant.

The process may be carried out in any mode and may include additional steps as required, including, but not limited to, pretreatment or follow-on treatment, or more than one membrane separation step.

Contaminants that may be removed by the process of the invention include dissolved organic materials, emulsions, colloids and suspended materials including oils, grease, bacteria and particulates.

In general, the tolerance of the processes of the invention for handling streams that contain significant quantities of solutes and undissolved matter is higher than that of prior art processes. In some circumstances, this means that a lesser degree of pretreatment is needed, or the process can be operated for a longer time before membrane cleaning is needed, or the process may be used to treat a stream that was previously untreatable, either on technical or economic grounds, by ultrafiltration.

The invention is expected to be useful in all areas where inorganic ultrafiltration membranes can be used, including, but not limited to food and beverage processing, process water treatment in the biotechnology, chemical and pharmaceutical industries, wastewater treatment, and municipal water treatment. The invention is expected to be particularly useful in treating oily wastewaters.

Other objects and advantages of the invention will be apparent from the description of the invention to those of ordinary skill in the art.

It is to be understood that the above summary and the following detailed description are intended to explain and illustrate the invention without restricting its scope.

DETAILED DESCRIPTION OF THE INVENTION

All percentages herein are by weight unless otherwise stated.

The term ultrafiltration includes nanofiltration.

The term selectivity as used herein to refer to gas separation means the selectivity measured using individual pure gases.

The invention is a membrane suitable for ultrafiltration, including nanofiltration, and methods for making and using the membrane. The membrane is highly fouling resistant.

Figure 1:
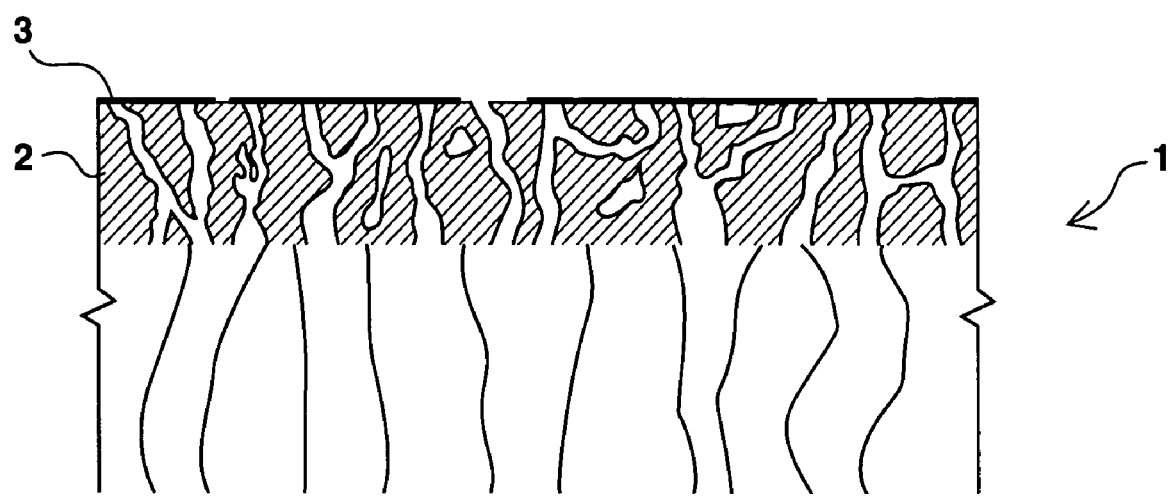
FIG. 1 is a schematic drawing showing a cross-section of a treated ultrafiltration membrane.

In a first aspect, the invention is an ultrafiltration membrane, indicated generally as 1 in FIG. 1. The membrane includes at least two elements: an inorganic ultrafiltration membrane, 2, and an organic polymer deposit, 3.

The structure of inorganic membrane 2 may be of any type that provides a finely porous feed surface of a porosity appropriate to operating the membrane as an ultrafiltration or nanofiltration membrane.

Various types of inorganic membranes are known, including those made from metals, carbon, glass, inorganic polymers and ceramics. The membrane can be made from any of these, so long as it can function as an ultrafiltration membrane. Inorganic membranes suitable for use as ultrafiltration membranes are described in *Ultrafiltration and Microfiltration Handbook*, by Munir Cheryan, Technomic Publishing Company, Lancaster, Pa., 1998. Preferably the membrane is a ceramic membrane.

To achieve a sufficiently finely porous feed surface, the inorganic membrane is usually a composite structure, comprising a porous support that has been coated with one or more layers having a smaller pore size than the support. If multiple coatings have been applied, the pore size usually decreases with each layer, with the outermost, most finely porous layer determining the filtration properties.

The feed surface, that is, the surface that will be exposed to the liquid to be treated, should have an average pore size of between about 10 Å and 1,000 Å.

The membrane may be in the form of sheets, tubes, perforated blocks, capillary fibers or any other convenient form known in the art and appropriate to the intended use.

A preferred membrane is a ceramic membrane and preferred forms are ceramic tubes and monoliths with internal tubes. Both types of ceramic membrane are manufactured by several commercial suppliers and are relatively easy to handle and use.

The untreated inorganic membrane should provide a high pure water flux, since the flux will be reduced by the polymer treatment. Preferably the inorganic membrane should provide a water flux, measured with a new, clean membrane at 25° C. and a feed-to-permeate transmembrane pressure difference of 50 psi of at least 100 gfd (gallons per square foot per day), more preferably at least 150 gfd and most preferably at least 200 gfd.

The membrane is treated by applying a thin coat of a dilute organic polymer solution to the feed surface of the membrane.

After the solvent has evaporated, an extremely thin polymer deposit, 3, is left on the surface, and this deposit covers or partially covers at least some of the pore openings. This deposit is so thin that its thickness cannot be measured easily by any direct measurement technique, nor can it be readily distinguished as a discrete coating layer even by scanning electron microscopy at high magnification.

The deposit is different in both structure and performance from the polymer coatings described in the prior art discussed above. Unlike these coatings, the polymer deposit does not provide the selectivity or separation capability of the membrane, and does not form a dense, continuous, gas-tight layer. If such a layer were to be deposited, it would reduce the water flux of the membrane to an unacceptable level.

Rather, deposit 3 should be extremely thin, typically less than 0.5 µm thick, and preferably no more than about 0.2 µm thick or most preferably no more than about 0.1 µm thick. Further, the deposit may be, and typically is, discontinuous, so that at least one or more pinholes, cracks, or small regions of uncoated inorganic membrane surface remain. Thus, the treatment creates one or multiple regions of polymer deposit on the feed surface, but the deposit is so thin or broken (and hence leaky) that the transmembrane water flux remains adequately high.

The thinness or leakiness of the polymer deposit means that, unlike the prior art membranes described above, the polymer deposit does not control the separation properties. A measure of this leakiness is that the treated membrane could not be relied on to perform adequately for separations that require a dense membrane with relatively few or no defects, such as reverse osmosis, pervaporation or gas separation.

Without wishing to be bound by theory, this desired attribute of the deposit can be conveniently quantified with reference to gas separation principles.

Gas permeation through a polymeric membrane may take place in several ways. If the membrane is porous and the pores are large—above about 0.1 µm—gases permeate the membrane indiscriminately by convective flow, and no separation occurs.

If the pores are smaller than about 0.1 µm (1,000 Å), the average pore diameter is as small or smaller than the mean free path of the gas molecules. (At atmospheric pressure the mean free path of common gases is in the range 500 to 2,000 Å.) Transport through such pores is governed by Knudsen diffusion, and the selectivity of a gas pair is inversely proportional to the square root of the ratios of the molecular weights of the gases. Unless the gases are of very different molecular weight, therefore, their transport rates are similar and the membrane exhibits low selectivity in favor of one gas over another.

An untreated ultrafiltration membrane has an average surface pore size consistent with Knudsen diffusion and, if tested for its gas separation properties, typically exhibits separation characteristics at least approximately consistent with this transport mechanism. For the gas pair carbon dioxide/nitrogen, for example, the selectivity is on the order of $\sqrt{(28/44)}$, or 0.8 for carbon dioxide over nitrogen, and $\sqrt{(44/28)}$, or 1.3 for nitrogen over carbon dioxide. That is, an ultrafiltration membrane offers only slight selectivity between the gases, and does so in favor of nitrogen over carbon dioxide.

Likewise, for the gas pair oxygen/nitrogen, the selectivity of an untreated ultrafiltration membrane is on the order $\sqrt{(28/32)}$, or 0.9 for oxygen over nitrogen and $\sqrt{(32/28)}$, or 1.1 for nitrogen over oxygen. Again, the ultrafiltration membrane offers only marginal selectivity between the gases, in favor of nitrogen over oxygen.

When the pore diameter of a membrane decreases to the 5 to 10 Å range, the pores begin to separate gases by a molecular sieving effect, and high selectivity is possible in principle.

Ultimately, if a polymeric membrane is without permanent pores, but forms a dense polymer layer, the transport mechanism is no longer by pore flow. Instead, permeant gases dissolve in the polymer material and diffuse through the membrane down a concentration gradient. Individual permeants are separated because of the difference in their solubilities in the polymer material and the difference in the rates at which they diffuse through it. A defect-free, dense polymer film will exhibit a selectivity in favor of one gas over another that represents this solubility-diffusivity driven selectivity through the polymer itself.

This selectivity is known for many polymers and gas pairs, and can be measured by simple experiments. For example, all polymeric membranes separating gases by solution-diffusion exhibit selectivity in favor of oxygen over nitrogen. For an average polymer, this selectivity is generally in the range between about 2 and 7, compared with 0.9 (nitrogen selective) for the selectivity based on Knudsen diffusion selectivity.

Similarly, all polymers exhibit solution-diffusion selectivity in favor of carbon dioxide over nitrogen, with typical selectivities ranging between about 5 and 50 or more, compared with 0.8 (nitrogen selective) for the selectivity based on Knudsen diffusion.

Gas separation membranes are much more sensitive to defects, such as pinholes or cracks in the selective membrane layer, than membranes used in ultrafiltration. For example, if a defect-free polymeric membrane has a selectivity of 100 for hydrogen over nitrogen, a corresponding membrane with one or two widely spaced pinholes may well have a selectivity less than 50, only half the value of the perfect membrane. If larger discontinuities, such as more numerous pinholes, or one or more cracks or breaks in the membrane layer are present, the gas separation capability of the selective layer is typically lost completely, and the membrane exhibits the gas separation properties, if any, of the underlying microporous substrate.

The relevance of the above discussion to the invention is that the comparative gas separation properties of the untreated and treated membranes can be used to indicate whether and to what extent the polymer treatment has resulted in a continuous coating of the membrane feed surface.

If the treatment has yielded a perfect, or close to perfect coating, the membrane will be fairly gas-tight and will exhibit a selectivity approaching the selectivity of the polymer. Such a membrane is outside the scope of the invention. If the treatment has left an ultrathin, broken or discontinuous deposit, the gas separation selectivity will be at or close to the Knudsen diffusion selectivity of the inorganic ultrafiltration membrane. If the treatment has left a deposit with just a very few defects, the selectivity will be somewhere between the Knudsen diffusion and solution-diffusion values.

Because the polymer deposit cannot be readily seen or its thickness measured, the gas separation performance provides a simple quantitative test of the membrane characteristics. We prefer to make this measurement with common gases, such as oxygen and nitrogen, or carbon dioxide and nitrogen.

We regard the polymer treatment as meeting our requirements if the membrane gas selectivity is substantially less than the solution-diffusion selectivity of the applied polymer. By substantially less, we mean that the membrane gas selectivity is less than half the solution-diffusion selectivity of the applied polymer.

More preferably, expressed in numerical terms, the membrane gas selectivity should be no more than about 1.3 for oxygen over nitrogen, and no more than about 2 or 3 for carbon dioxide over nitrogen.

Most preferably, the membrane should have no significant gas selectivity, such that gas transport remains substantially close to the Knudsen diffusion value.

The organic polymer used to treat the membranes should preferably have certain properties. First, the polymer should preferably be hydrophilic, so as not to impede water transport through the membrane and to discourage adhesion of hydrophobic fouling material to the membrane surface.

In addition, the polymer should preferably be water swellable but water insoluble. By water insoluble, we mean that the polymer will not dissolve to any meaningful concentration in liquid water at any temperature. By meaningful concentration, we mean a concentration above the tens of ppm level.

By water swellable, we mean that on immersion in liquid water for a prolonged period, such as 24 hours, the weight of a polymer sample increases by a measurable amount, such as 10 wt % or more. Preferably the water sorption should be substantially higher than this, so that the polymer swells by a weight increase of 40% or more, and more preferably by 70% or more, and most preferably by at least 100%.

The most preferred polymers should thus swell extensively in water without dissolving.

A particular advantage of using a water-insoluble polymer for the treatment is that crosslinking may not be required after the polymer has been deposited to render it stable. This simplifies the membrane preparation technique.

In the alternative, water-soluble polymers may be used and may be crosslinked after deposition to prevent the polymer gradually washing off when the membrane is used to treat aqueous solutions.

The polymer may be glassy or rubbery. Many water-swellable or water-soluble polymers are known and their properties will be familiar to those of skill in the art.

Glassy polymers that may be used include, but are not limited to, polyvinyl alcohol (PVA), cellulose derivatives, acrylic-based polymers and polyvinylpyrrolidone. When in a water-swollen state, these materials offer relatively high water permeability.

In general, however, we prefer to use polymers that are rubbery, or at least include a rubbery segment within the polymer structure, because rubbery polymers tend to provide higher intrinsic water permeability than glassy polymers. By a rubbery polymer, we mean a polymer that is above its glass transition temperature under the conditions at which the membrane is likely to be operated. Thus, any polymer that has a glass transition temperature below 0° C. meets this definition, and in general, any polymer that has a glass transition temperature below about 10° C. meets this definition.

Preferred polymers that are rubbery or contain rubbery segments sufficient to meet the above definition include epichlorohydrin polymers; epichlorohydrin copolymers, such as epichlorohydrin-ethylene oxide copolymers; polyethylene oxide polymers and copolymers; allyl glycidyl ether polymers; polyurethanes; and other copolymers having relatively high proportions of polyether blocks, by which we mean preferably 50% polyether or higher.

Most preferably, the polymer is a polyamide-polyether block copolymer. Such polymers provide high intrinsic permeability to water, and we have discovered that they can be prepared and coated well onto inorganic ultrafiltration membranes, even from extremely dilute solutions.

Such polymers are available commercially, for example from ATOFINA Chemicals, Philadelphia, Pa. under the name PEBAX®. PEBAX polymers have the general formula

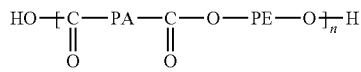

where PA is a polyamide segment, PE is a polyether segment and n is a positive integer. The polyamide blocks provide mechanical strength; the polyether blocks allow high water permeability.

These polymers are available in a range of grades having different proportions of polyamide and polyether. Preferred grades in terms of water sorption capabilities are grade 1074, which has the following structure:

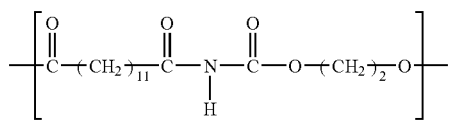

and grade 1657 which has the following structure:

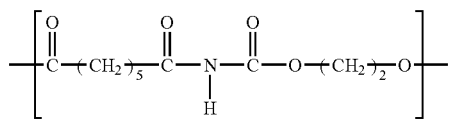

For preference, the treated membrane should present a surface to the feed solution that is electrically neutral overall, which means that the polymer used for the treatment should be electrically neutral. More specifically, polymers having ion-exchange properties or containing free charged groups, such as the sulfonated polymers described in U.S. Pat. No. 6,026,968, should be avoided.

The treated ultrafiltration membrane exhibits a number of distinctive properties, when compared under like conditions with an otherwise identical untreated membrane.

First, the treatment is not relied upon to impart ultrafiltration separation properties. The untreated membrane to which the treatment is applied is already capable of functioning as an ultrafiltration or nanofiltration membrane.

The treatment slightly increases the thickness of the membrane overall, as well as at least partially covering the pores, so even if the polymer that is used has very high intrinsic water permeability, the treated membrane typically exhibits a lower initial water flux and higher permeation resistance than the initial water flux and resistance of an untreated membrane of the same structure and composition. The initial water flux is the flux measured with a clean, previously unused membrane as originally supplied by the commercial manufacturer or as prepared according to the teachings herein.

For example, the initial water flux, when tested with pure water, and at the same temperature and pressure, may be 250 gfd for an untreated sample and may drop to 50 gfd for a treated sample. As another example, the initial water flux, when tested with a 2,000-ppm motor oil emulsion, may be 300 gfd for an untreated sample and 80 gfd for a treated sample, both measurements being made at the same temperature and pressure. Thus, the treatment may reduce the initial water flux substantially, such by a factor of 2, 4, 6 or more.

The higher the intrinsic water permeability of the treating polymer, and the thinner the deposit, the less will the initial water flux be reduced. On the other hand, if the treatment results in polymer deposits that are so insubstantial that many fully open pores remain exposed or large regions of the feed surface remain untreated, the ability of the membrane to resist fouling will not be significantly improved.

The chosen balance between initial flux reduction and fouling resistance will vary depending on the specifics of the use to which the membrane is put, as well as the magnitude of the untreated membrane flux. In general, a pure water flux reduction after treatment to as low as 20% or even less of the untreated initial value can be acceptable, so long as the initial flux after treatment remains adequate.

In absolute terms, it is preferred that the treated membrane provide an initial pure water flux under typical ultrafiltration conditions, such as 50 psi feed-to-permeate transmembrane pressure difference and 25° C., of at least about 40 gfd, more preferably at least about 80 gfd and most preferably at least about 100 gfd.

Although their initial water fluxes tend to be low compared with prior art membranes, in use our treated membranes are much less susceptible to fouling than their untreated equivalents. That is, when they are exposed to common contaminants such as oil, grease, bacteria or particulates, the treated membranes manifest a much slower rate of flux decline than the untreated membranes.

In a second aspect, the invention includes methods for making the fouling-resistant membranes described above. The polymer treatment may be applied as a step when the membrane is being manufactured, or may be applied to improve the properties of already made commercial membranes, preferably before they are used for the first time.

The preparation of inorganic ultrafiltration membranes is well documented in the literature, and is described, for example, in many patents, including U.S. Pat. Nos. 4,983, 423; 5,106,502; and 5,824,220. Extensive discussion of preparation techniques is given in various papers and books, such as *Inorganic Membranes; Synthesis, Characterization and Applications*, by R. R. Bhave (ed), Chapman Hall, New York, 1991.

As already mentioned, preferred membranes are composite ceramic membranes. Membranes of this type can be made by applying one or several successive ceramic coatings to a porous support.

Suitable materials for the porous support include refractory oxides, such as alumina, zirconia, cordierite (magnesium aluminum silicate), mullite (an aluminosilicate) and spinel (magnesium aluminum oxide), carbon, sintered steel or other metals, and carbides, such as silicon carbide.

Commonly such supports are manufactured by preparing a paste of particles with binders, viscosity modifiers, lubricants, wetting agents and the like as required. The paste is poured into a mold, extruded through a die or otherwise shaped to the desired geometry, baked to remove organic components, then sintered at very high temperature to create the finished porous article. After it has been finished, the support typically has pores of about 1-10 μm in diameter.

The support may be of any convenient shape for subsequent coating. Ceramic tubes and monolithic blocks perforated by parallel tubes to form a "honeycomb" cross section are both readily available commercially.

To form the ultrafiltration selective layer, at least one surface of the support must be coated with one or multiple layers having finer pores than the support. The coating may be deposited in any way, by slip-casting or dynamic filtration, for example. The coating is preferably deposited by slip-casting to make a more open ultrafiltration membrane, and preferably by the sol-gel technique to make a tighter ultrafiltration or nanofiltration membrane. The two processes may also be used in succession to make a tighter membrane.

Suitable materials for the selective layers of the ultrafiltration membrane include the refractory oxides mentioned above, as well as carbides and nitrides, for example. To slip-cast this layer onto the support, a suspension of particles of the desired material, with binders, viscosity modifiers or other agents as needed is prepared. The slip is brought into contact with the support for a few seconds, by filling the tubes or cavities with slip, or simply by pouring it over the surface to be coated. The excess slip is drained off, and the coated form is dried and fired. The temperature and duration of the firing step(s) determine the final pore size and porosity.

Usually several slip-coated layers are applied in series, each layer being formed from a suspension of progressively finer particles. The slip coating-sintering procedure can be used to make membranes with pore diameters down to about 100 to 200 Å.

If more finely porous membranes are required, they may be made by a sol-gel technique. Such techniques for preparing ceramic materials with very fine pores are known in the art and are described in U.S. Pat. No. 3,944,658, for example. Methods of making membranes with very fine pores using these techniques are described in U.S. Pat. Nos. 5,006,248 and 5,208,190, for example.

In brief, the membranes may be made by forming a sol of fine metal alkoxide particles, preferably alumina. This is preferably done by adding the alkoxide to water that is being rapidly stirred or agitated. A hydrolysis reaction takes place, forming metal hydroxide, which precipitates into the water in the form of nanoparticle-sized clusters of metal hydroxide monomer or dimer particles, or larger clusters of polymeric particles, depending on the amount of water used. Acid is added and the solution is maintained at an elevated temperature for an extended period to stabilize the sol by keeping the particles in suspension. After cooling, a stabilized colloidal sol remains.

The sol can be coated in this form onto any appropriately microporous support. Coating is preferably carried out by dipping or spraying. The support is then dried carefully under controlled conditions to avoid cracking, converting the coating into a gel. Alternatively, the sol may be partially gelled into a relatively viscous state before coating, and additives such as polymeric binders may be included to control viscosity and surface tension.

Finally the coated support is sintered at high temperature to form the finished membrane. Membranes with pore sizes in the 10- to 100-Å range can be made by this method.

As a preferred alternative to manufacturing the inorganic membranes, they may be purchased from commercial suppliers. Corning Incorporated, of New York, offers ceramic ultrafiltration membranes in the form of a honeycomb ceramic monolith or as alumina tubes. Ceramem Corporation, of Waltham, Mass., offers ultrafiltration and nanofiltration membranes as tubular monoliths of silica or titania on a recrystallized silicon carbide support.

Whether the inorganic membrane is manufactured from raw materials or purchased, the making of the membrane is completed by applying the polymer treatment to the membrane feed surface. This can be done by any suitable technique, such as dipping or spraying. Since the feed surface is usually the inside surface of the tubes or monolith, convenient methods are simply to pour the solution over these surfaces, or to fill and drain the tubes or blocks.

The coating solution should be very dilute, such as less than 0.5 wt % polymer and preferably less than 0.3 wt % polymer. Our most preferred solutions contain only 0.1 wt % of polymer. The inorganic membranes have excellent chemical resistance to attack by organic liquids, so any organic solvent that will dissolve the chosen polymer may be used. If the most preferred polyamide-polyether block copolymers are used as the coating material the most preferred solvent is n-butanol or other aliphatic alcohol.

The membranes are drained and dried, leaving a thin polymer deposit on the surface. The process may be repeated to provide a slightly thicker or more complete coating. However, even two applications of 0.2 wt % solution may result in a membrane with too low initial water flux, so we prefer to apply the treatment only once.

After evaporation of the solvent, the polymer deposit left on the membrane is so thin that it cannot be seen as a discrete layer by SEM at a magnification of 800. We believe the deposit is less than 0.5 µm thick, and likely only about 0.1 µm thick.

In a third aspect, the invention includes ultrafiltration and nanofiltration processes using the treated inorganic membranes. These processes can be applied to treatment of aqueous or organic solutions. To simplify the description, processes are described below in terms of water treatment. It will be appreciated by those of skill in the art that similar methods and modes of operation can be used to treat solutions in which the solvent is organic. Organic solutions that may be treated by the process of the invention include those in which the solvent is an alcohol, such as ethanol, an alkane, such as hexane, or an aromatic, such as toluene.

Contaminants that may be removed by the process of the invention encompass all of those within the scope of conventional ultrafiltration and nanofiltration. These, include, but are not limited to, emulsified or colloidal organic matter, such as greases, oils or paints; bacteria and viruses; dissolved macromolecules, such as proteins, dyes, or detergents; and moving toward the nanofiltration end of the scale, dissolved or colloidal lighter organic materials, such as lightweight oils, sugars, and multivalent salts, with molecular weights down to about 70.

Figure 8:
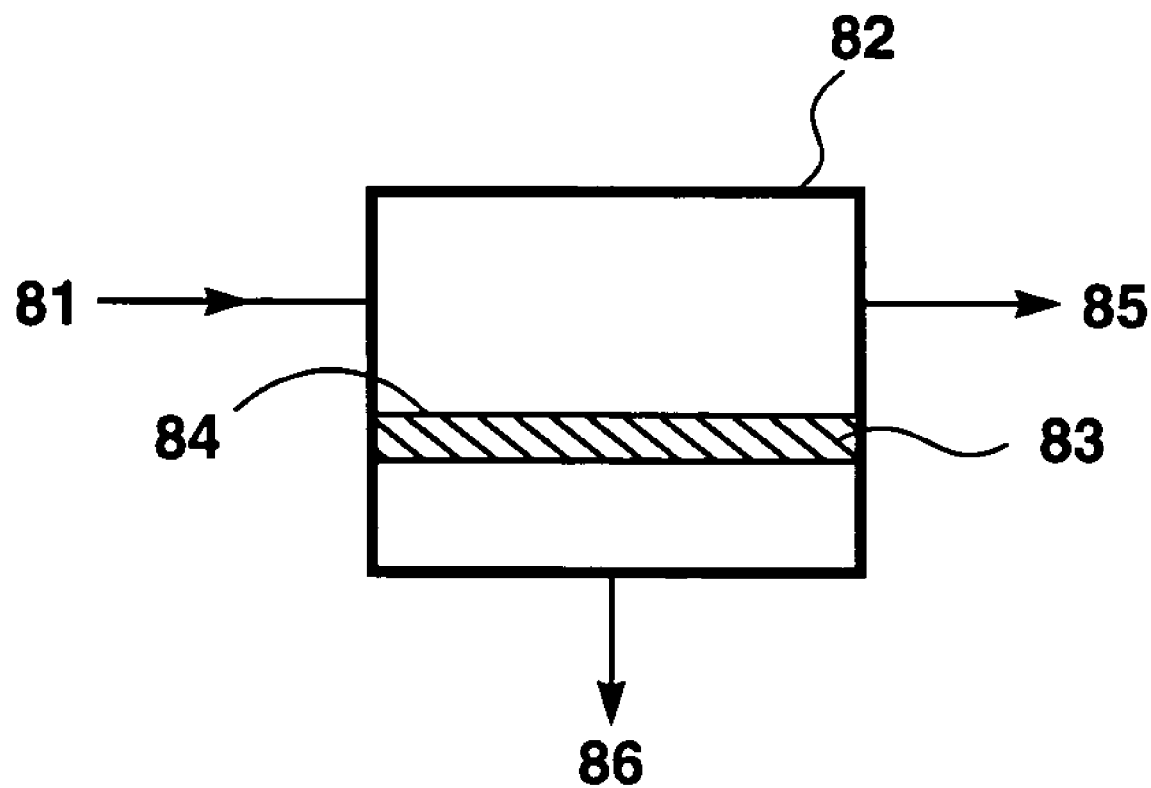
FIG. 8 is a schematic diagram of a basic embodiment of the process of the invention.

In its most basic form, as shown in FIG. 8, the process includes passing a feed stream, 81, into a membrane module, 82, containing a treated inorganic membrane, 83, in accordance with the description above. The feed stream flows across the feed side, 84.

A driving force for transmembrane permeation is provided by a pressure difference between the feed and permeate sides of the membrane. This pressure difference can be achieved by applying a higher than atmospheric pressure on the feed side, a lower than atmospheric pressure on the permeate side, or a combination of both. This pressure difference is typically up to about 200 psi for nanofiltration, and preferably lower for ultrafiltration, such as no higher than about 100 psi, 70 psi, 60 psi, 50 psi or less. The pressure difference may be held constant, or may be gradually increased to overcome resistance and hold flux constant if fouling occurs.

For some applications, such as shipboard applications, operation at constant flux is preferred, by maintaining a fixed feed pressure and gradually lowering the permeate pressure.

Under this driving force, water permeates the membrane and is withdrawn as treated permeate or filtrate stream, 86. Depending on the grade of membrane used, material down to a diameter of about 10 Å can be rejected by the membranes with rejections of 90% or better. The residue or retentate stream, 85, concentrated in matter that has been rejected by the membrane, is withdrawn from the residue end of the modules on the feed side.

The process may be carried out in any mode, including single pass, batch, and feed-and-bleed modes, all of which are familiar in the industry.

Figure 9:
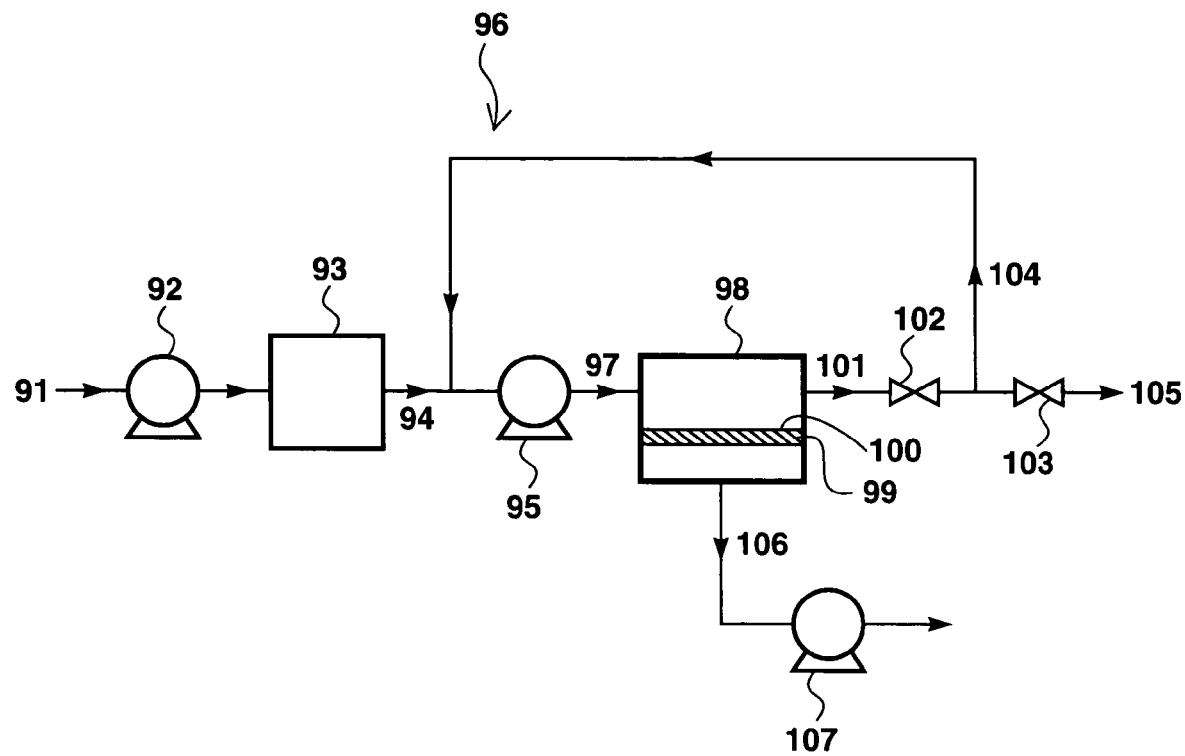
FIG. 9 is a schematic diagram of a preferred embodiment of the process of the invention operated in feed-and-bleed mode.

A preferred mode is feed-and-bleed, a representative, simple embodiment of which is shown in FIG. 9. It will be appreciated by those of skill in the art that this is a very simple schematic diagram, intended to make clear certain aspects of the invention, and that an actual process may include additional components of a standard type, such as heaters, chillers, pumps, blowers, other types of separation and/or fractionation equipment, valves, switches, controllers, pressure-, temperature, level- and flow-measuring devices and the like.

Turning now to FIG. 9, raw feed stream, 91, enters the process through feed pump 92 and passes into optional pretreatment step 93. This step prepares the raw stream for ultrafiltration by removing gross undissolved matter.

Any suitable type of treatment can be used for this step, including gravity separation and filtration. The coarsest particulates can be removed simply by running the feed through settling tanks or parallel plate separators, for example. Less coarse particulates may be removed by cyclone separation, by a low- or high-speed centrifuge, or by dead-end cake filtration. To remove smaller particles, less than about 5 µm in diameter down to about 0.1 µm in diameter, microfiltration can be used.

If the source of the feed is such that suspended matter with a range of particle sizes is present, step 93 may include a train of individual steps, for example separation in a parallel plate separator, followed by one or two microfiltration steps in series. Such treatments are very familiar to those of skill in the art.

Pretreated stream 94 enters the feed-and-bleed processing loop, generally indicated as 96, where it is mixed with recirculating stream 104 to form feed stream 97 to ultrafiltration unit 98. Circulation of liquid in the processing loop is provided by circulation pump, 95.

To provide the driving force for transmembrane permeation, an elevated pressure on the feed liquid may be provided by feed pump 92, or a reduced pressure on the permeate side by pump 107, or both.

The ultrafiltration unit 98 is equipped with one or more membrane modules containing ultrafiltration membranes, 99, as described above, having feed surfaces, 100. The modules can be arranged in parallel or series arrangements, both of which configurations are well known and common in the art. The stream under treatment circulates across the feed surfaces of the membranes and exits the residue ends of the modules as stream 101, passes through open valve 102 and is recirculated as stream 104 in the processing loop. Treated concentrate stream, 105, is drawn off as desired by opening valve 103.

Under the influence of the transmembrane driving force, the water or other liquid being filtered permeates the membranes and is withdrawn as permeate stream 106 by permeate pump 107.

The process may include any additional steps as required. For example, either the concentrated retentate stream or the permeate stream, or both, may be sent to further treatment, including, but not limited to, other membrane separation steps, such as additional ultrafiltration steps or nanofiltration or reverse osmosis steps.

As one non-limiting example, it is common practice to send the retentate to a second feed-and-bleed step, to send the retentate from that step to a third feed-and-bleed step and so on, for a typical series of three, four or five steps. By splitting the separation into multiple steps, the degree of retentate concentration in each step is limited, and higher flux is maintained in each step.

If required, more details of various operating modes, and the effect of their operating parameters on processing results, may be found in Chapter 7 of *Ultrafiltration and Microfiltration Handbook*, by Munir Cheryan, Technomic Publishing Company, Lancaster, Pa., 1998.

A feature of the membranes and processes of the invention is their ability to resist fouling. As illustrated in the Examples section below, when operated at constant feed and permeate pressure, the membranes of the invention are often able to maintain flux at or close to the initial value for periods of days or weeks without cleaning, even when processing oil emulsions or comparatively highly fouling mixtures, such as bilgewater. Expressed another way, the resistance to permeation increases relatively little over time, so that an increased driving force is not required to maintain flux.

Although the membranes of the invention are less susceptible to fouling than prior art membranes, they may be cleaned by backflushing from time to time as needed, or by using chemical cleaners. It is expected that intervals between cleaning may be longer than were previously needed when handling a comparable feed. For example, if a membrane system handling a wastewater stream would have needed daily backflushing if prior art membranes were used, it may be possible to operate the system with weekly cleanings using the treated inorganic membranes of the invention.

Internal fouling, caused by material trapped inside membrane pores or surface crevices, is believed to be nearly eliminated by the organic polymer treatment. As a result, the membranes of the invention often recover their flux much better after cleaning than their untreated counterparts, as illustrated in the Examples section below.

Application areas include the existing large applications of treatment of a variety of industrial oily wastewaters. In addition, feeds that have previously been more difficult to treat by ultrafiltration, such as municipal wastewaters and industrial wastewaters containing multiple contaminants are more easily treated using the lower fouling, treated membranes of the invention.

A number of specialized applications are also possible, such as treatment of produced water in oil and gas fields, wastewaters from ships, production of potable water on ships, and treatment of littoral water for a variety of uses.

The invention is now further described by the following examples, which are intended to be illustrative of the invention, but are not intended to limit the scope or underlying principles in any way.

EXAMPLES

Example 1

Untreated Membrane Pure-Gas Permeation Properties

A number of specialized applications are also possible, such as treatment of produced water in oil and gas fields, wastewaters from ships, production of potable water on ships, and treatment of littoral water for a variety of uses.

The invention is now further described by the following examples, which are intended to be illustrative of the invention, but are not intended to limit the scope or underlying principles in any way. A number of specialized applications are also possible, such as treatment of produced water in oil and gas fields, wastewaters from ships, production of potable water on ships, and treatment of littoral water for a variety of uses.

Three ceramic ultrafiltration membrane elements (Corning, Inc., Corning, N.Y.) were obtained. The elements were tubular monoliths of a silica selective layer on a mullite (alumina silica oxide) support. The elements were 1 inch in diameter, 12 inches long, and had an effective membrane area of 0.14 m². The nominal pore size of the elements was 5 nm (50 Å).

The membrane elements were tested in a bench-scale, stainless steel, ultrafiltration test system with pure oxygen, nitrogen, and carbon dioxide. The feed pressure was 1 psig, the permeate pressure was atmospheric, and the temperature was 22° C. Because the membranes were expected to have very high gas fluxes, the feed pressure was kept very low, to keep the fluxes within measurable limits. The fluxes were measured and the permeances (pressure-normalized fluxes) were calculated. The results are shown in Table 1.

TABLE 1

| Membrane Element | Permeance ($10^{-6}$ cm³(STP)/cm² · s · cmHg) (gpu) | | |
|---|---|---|---|
| | Carbon Dioxide | Nitrogen | Oxygen |
| #1 | 10,100 | 10,100 | 10,100 |
| #2 | 10,100 | 10,100 | 10,100 |
| #3 | 10,600 | 9,040 | 9,040 |

As can be seen, Elements #1 and #2 showed no selectivity between any of the gases within the accuracy of the experiment (±about 1,000 gpu at this high flux). Element #3 showed slight selectivity (1.2) in favor of carbon dioxide over nitrogen. This very slight selectivity in favor of carbon dioxide may arise from the limits of experimental accuracy, or may indicate that the pore size of the membranes is so small that some effects of molecular sieving are beginning to be seen.

The results for all three elements are inconsistent with gas separation by solution-diffusion.

Example 2

Treated Membrane Pure-Gas Permeation Properties

Elements #1 and #2 from Example 1 were treated with a polyether-polyamide block copolymer (PEBAX®, Atofina Chemicals, Philadelphia, Pa.). A solution of 0.5% PEBAX 1074 in n-butanol was poured through the ceramic elements. The elements were allowed to dry and a second treatment was applied. The elements were tested with pure gases as in Example 1; the feed pressure was increased to 10 psig, however. The results are shown in Table 2.

TABLE 2

| Membrane Element | Permeance (gpu) | | | | | |
|---|---|---|---|---|---|---|
| | Carbon Dioxide | | Nitrogen | | Oxygen | |
| | Untreated | Treated | Untreated | Treated | Untreated | Treated |
| #1 | 10,100 | 130 | 10,100 | 18 | 10,100 | 21 |
| #2 | 10,100 | 70 | 10,100 | 3 | 10,100 | 7 |

As can be seen, the elements now exhibit selectivity for oxygen over nitrogen of 1.2 and 2.3, and for carbon dioxide over nitrogen of 7.2 and 23. These selectivities are much lower than the solution-diffusion selectivity of the PEBAX polymer for these gas pairs, which is about 2.8 for oxygen/nitrogen and about 60 for carbon dioxide/nitrogen, indicating that the polymer layer contains a few defects.

Nevertheless, these relatively high gas selectivities indicate that the membranes would not provide high enough flux if used as filtration membranes.

Example 3

Pure-Water Permeation Properties

The three membrane elements of Examples 1 and 2 were tested with pure water at a feed pressure of 60 psig, a permeate pressure of 0 psig, a feed-to-residue pressure drop of 8 psig, and a cross-flow rate of 3 gpm. The results are shown in Table 3.

TABLE 3

| Membrane Element | Water Flux (gfd) |
| --- | --- |
| #1 (treated) | 18 |
| #2 (treated) | 14 |
| #3 (untreated) | 212 |

The untreated element has a pure water flux of 212 gfd. The water flux of the treated elements has dropped by an order of magnitude or more. This confirms that the membranes are outside the preferred specifications of the invention.

Example 4

Treated Membrane Pure-Gas Permeation Properties

Ceramic ultrafiltration membrane elements were obtained from CeraMem (Waltham, Mass.). The lab-scale elements were tubular monoliths of a silica selective layer on a recrystallized silicone carbide (RSiC) support. The elements were 1 inch in diameter, 12 inches long, and had an effective membrane area of 0.14 m$^2$. The nominal pore size of the elements was 5 nm (50 Å).

Two elements were treated with a solution of PEBAX 1074 in n-butanol. A single treatment of 0.2% PEBAX was applied to Element #1205; a single treatment of 0.1% PEBAX was applied to Element #1222. The elements were allowed to dry and were tested as in Example 1 with pure nitrogen and carbon dioxide. Element #1294 was left untreated and was tested for comparison. The feed pressure was 5 psig (3 psig for Element #1294), the permeate pressure was atmospheric, and the temperature was 22° C. The fluxes were measured, and the permeances and the selectivities were calculated. The results are shown in Table 4.

TABLE 4

| Membrane Element | PEBAX Concentration (%) | Permeance (gpu) | | Selectivity |
| --- | --- | --- | --- | --- |
| | | Carbon Dioxide | Nitrogen | $CO_2/N_2$ |
| #1205 | 0.2 | 2,800 | 3,200 | 0.9 |
| #1222 | 0.1 | 8,900 | 9,400 | 0.9 |
| #1294 | — | 11,700 | 15,300 | 0.8 |

The treated elements had lower fluxes than the untreated element. All three elements exhibited gas selectivity in favor of nitrogen over carbon dioxide. The results are inconsistent with the results expected for a polymer selective layer separating by solution diffusion, and consistent with separation through a finely porous membrane by Knudson diffusion.

Example 5

Pure-Water Permeation Properties

Additional membrane elements were treated with a 0.1% solution of PEBAX 1074 as in Example 4. The treated membrane elements were tested with pure water at a feed pressure of 60 psig, a permeate pressure of 0 psig, a temperature of 25° C., and a feed flow rate of 2.5 gpm. The fluxes were measured and the permeation resistances were calculated as the feed-to-permeate transmembrane pressure required for unit flux. The results are shown in Table 5.

TABLE 5

| | | Before PEBAX Treatment | | After PEBAX Treatment | |
| --- | --- | --- | --- | --- | --- |
| Membrane Element | PEBAX Concentration (%) | Water Flux (gfd) | Resistance (psi/gfd) | Water Flux (gfd) | Resistance (psi/gfd) |
| #1205 | 0.2 | 295 | 0.20 | 23 | 2.61 |
| #1222 | 0.1 | 258 | 0.23 | 55 | 1.09 |
| #1269 | 0.1 | — | — | 99 | 0.61 |
| #1273 | 0.1 | — | — | 92 | 0.65 |
| #1275 | 0.1 | — | — | 82 | 0.73 |

As can be seen, even a single treatment with a 0.2 wt % polymer solution resulted in a water flux that would be too low for many applications.

Treatment with a 0.1 wt % polymer solution provided fluxes approaching 100 gfd. Such a flux is sufficiently high for many applications.

The resistance is a measure of the driving force that must be applied to generate a desired flux. As can be seen, the treatment tends to increase the permeation resistance, although it still remains below about 1 psi/gfd.

Example 6

Figure 4:
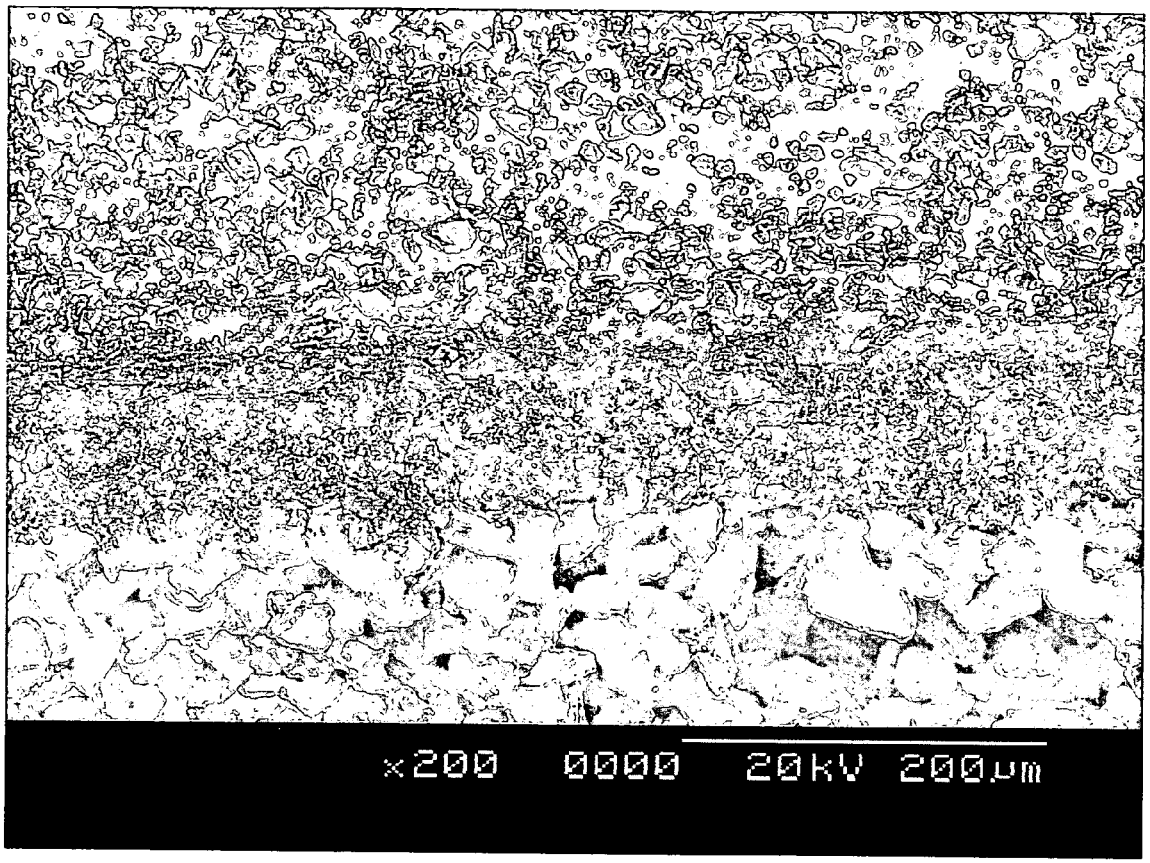
FIG. 4 is an SEM photo showing a treated composite ceramic membrane, showing the silicone carbide support layer and the silica selective layer.

PEBAX-Treated Element #1205 was dissected and across-sectional area was examined under a scanning electron microscope (SEM). FIG. 4 is an SEM photo showing the silicone carbide support layer and the 50-µm-thick silica selective layer of the ceramic element.

Figure 5:
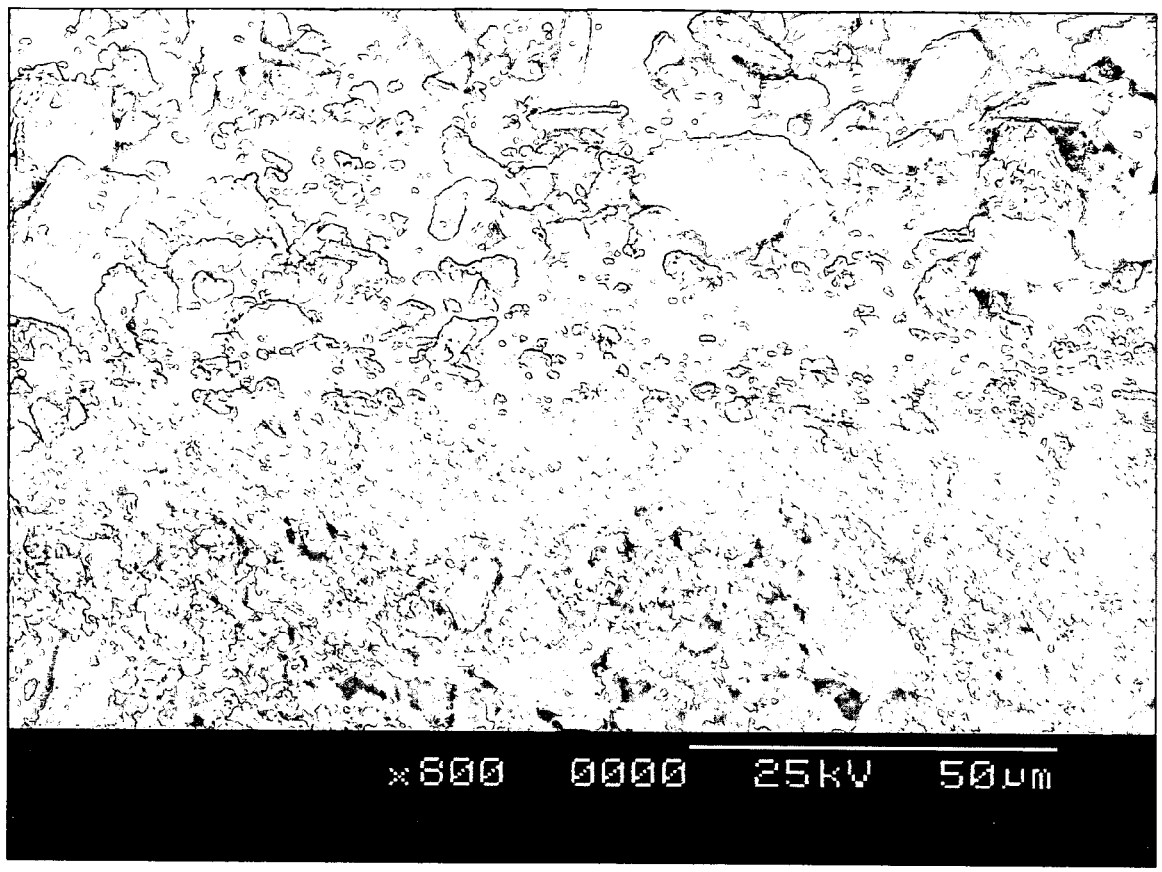
FIG. 5 is an SEM photo showing only the selective layer of the membrane of FIG. 4. The PEBAX deposit is too thin to be observed at a magnification of 800. The particles on the surface are residual grit from various feed solutions used in the permeation tests.

FIG. 5 is an SEM photo showing only the selective layer of the element. The PEBAX deposit is too thin to be observed at this magnification (800×). The particles on the surface are residual grit from various feed solutions used in the permeation tests.

Example 7

Oil/Water Mixture Tests

Treated membrane Element #1275 and comparable untreated Element #1268 were tested side-by-side continuously (24 hours a day) for 18 days. The tests were performed using a bench-scale ultrafiltration test system operated in full recirculation mode, that is, the residue and permeate streams exiting the elements were recombined in the feed tank and recirculated through the test system. The initial feed solution was a 2,000-ppm motor oil emulsion. The molecular weight of the motor oil was estimated to be between 200 and 400.

Figure 2:
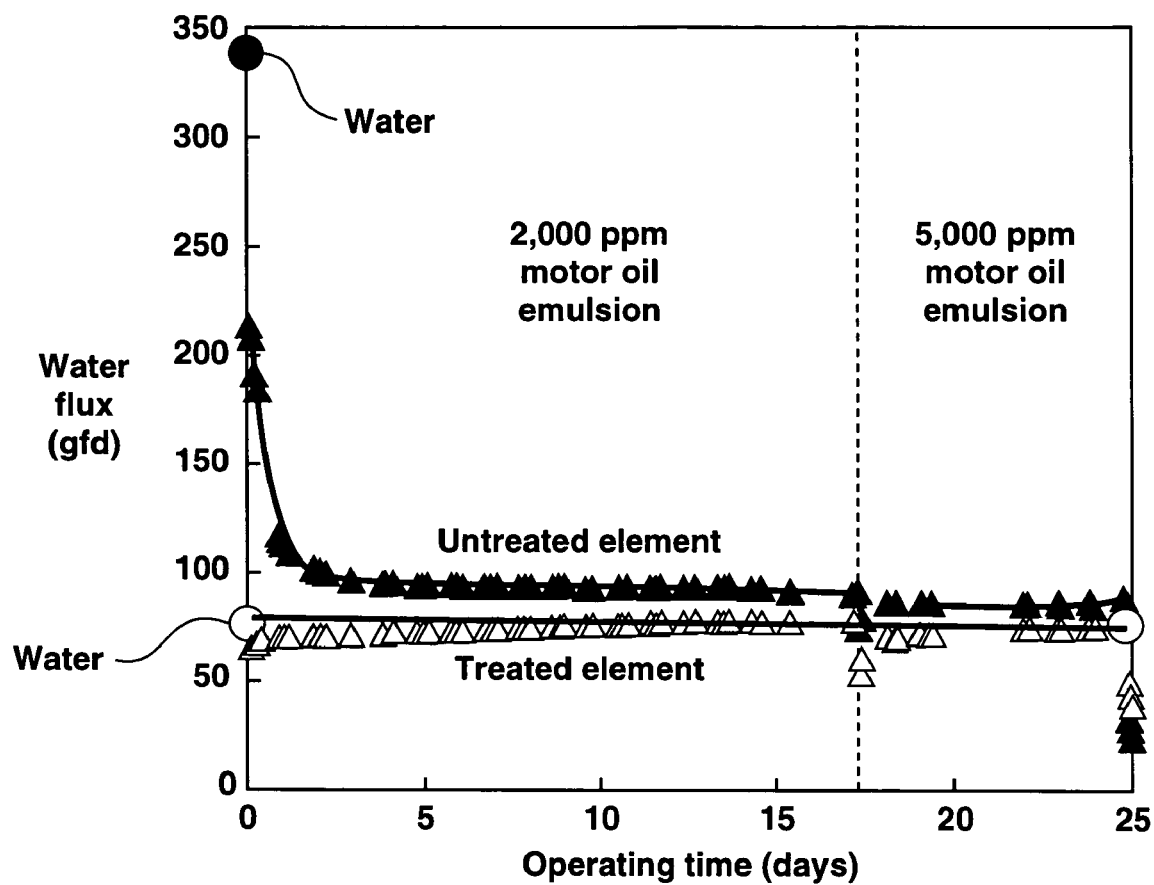
FIG. 2 is a graph showing water flux as a function of operating time for untreated and treated elements exposed to 2,000 ppm and 5,000 ppm oil/water emulsions.

To further challenge the membranes, the feed solution was changed to a 5,000-ppm motor oil emulsion and the test was continued for another 7 days. Throughout the 25-day test period, the feed flow rate was 7 gpm and the feed temperature was 25° C. The feed pressure was 60 psig, the feed-to-residue pressure drop was 12 psig, and the permeate pressure was atmospheric. The water fluxes of the elements were measured frequently during the 25-day test period. The results of the tests are shown in FIG. 2.

The water flux of the untreated element immediately declined from an initial pure water flux of 339 gfd to 214 gfd with the oil/water mixture, then continued to decline over the 18-day test period to 91 gfd. The water flux of the treated element declined from an initial pure water flux of 77 gfd to 66 gfd with the oil/water mixture. The flux then slowly increased up to 76 gfd, nearly the same as the initial pure-water flux.

When the feed solution was changed to a 5,000-ppm motor oil emulsion, the flux of the untreated element declined to 85 gfd. The flux of the treated element remained stable at 76 gfd.

Example 8

Synthetic Bilge Water Tests

At the end of the 25-day test period described in Example 7, both elements were cleaned with an enzymatic cleaning solution. The feed tank was emptied of the oil emulsion solution and refilled with a 1% solution of Terg-A-Zyme® (Alconox, White Plains, N.Y.) in water. The test system was run for 24 hours at room temperature. The elements were then flushed repeatedly with pure water to remove as much oil residue as possible, and the pure-water fluxes were remeasured. The fluxes of both elements were unchanged.

Figure 3:
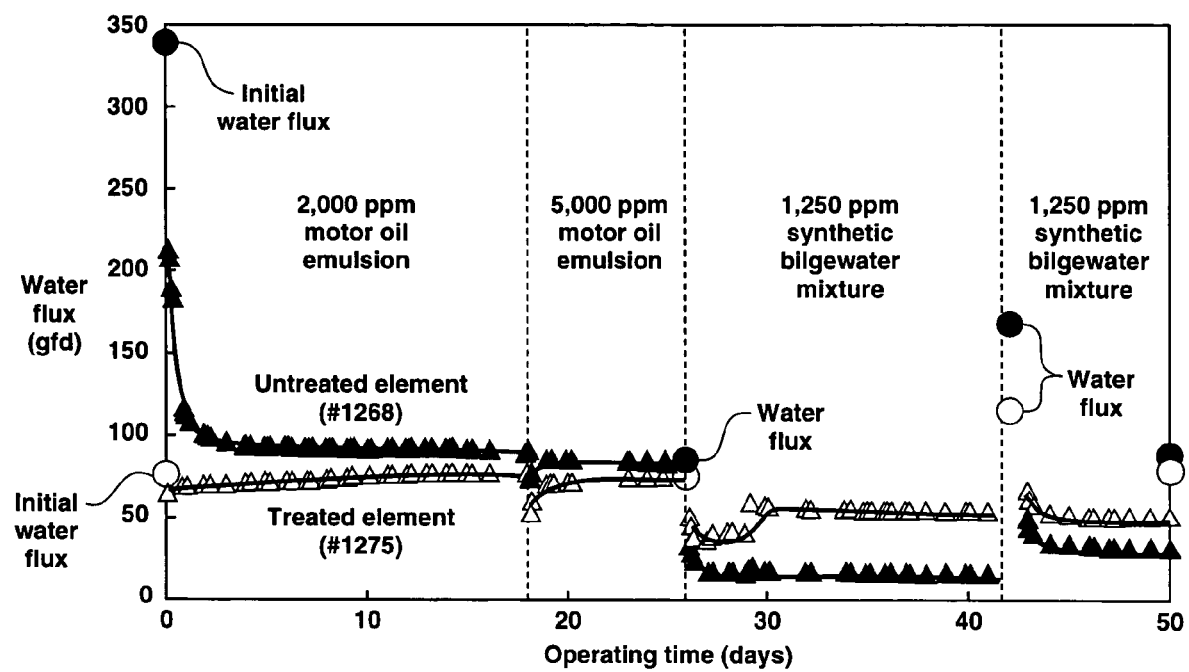
FIG. 3 is a graph showing water flux as a function of operating time for untreated and treated elements exposed to 2,000 ppm and 5,000 ppm oil/water emulsions, and to a synthetic bilgewater mixture.

The tests of Example 7 were then continued for another 15 days with a highly-fouling synthetic bilge water solution containing 1,250 ppm of oils, detergents, and solvents. As shown in FIG. 3, the water flux of the untreated element declined to 16 gfd within the first day and remained unchanged thereafter. The water flux of the treated element declined to 38 gfd the first day, then gradually increased back up to 56 gfd, where it stabilized for the remainder of the 15-day test period.

After the 15-day bilge water test (40 days total test period), the elements were again cleaned with the Terg-a-Zyme solution, this time at 35° C., and flushed with pure water for three days. The pure-water fluxes were remeasured. The flux of the untreated element increased to 160 gfd; the flux of the treated element increased to 115 gfd.

The tests were continued for another seven days with a fresh batch of 1,250-ppm synthetic bilge water solution. The water flux of the untreated element declined immediately to 51 gfd and continued to decline to 33 gfd over the next seven days. The water flux of the treated element declined to 68 gfd, then continued to decline to 51 gfd over the next seven days.

Example 9

Oil Rejection

The permeate from the test system was analyzed for total organic carbon (TOC) content to estimate the rejection properties of the membrane elements. The untreated element showed a 98+% TOC rejection; the PEBAX-treated element showed a higher TOC rejection of 99+%. The increased rejection is consistent with a tightening of the membrane by the polymer treatment. The molecular weight of the motor oil was believed to be in the range 200-400.

Example 10

Oil/Water Mixture Tests

Figure 6:
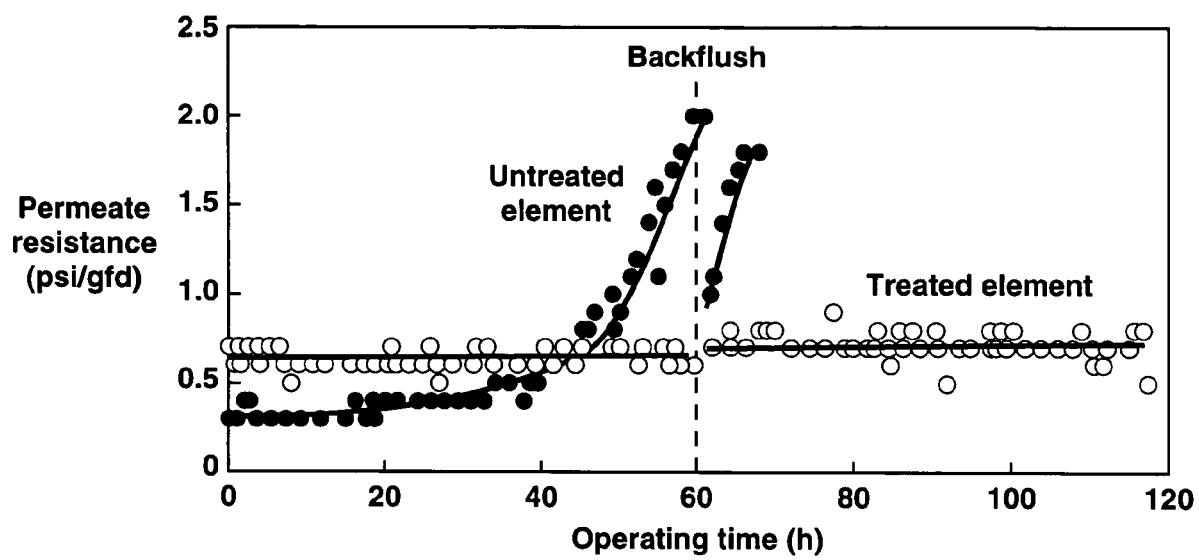
FIG. 6 is a graph showing results of a long-term comparative permeation test carried out with treated and untreated lab-scale ceramic elements.

Two membrane elements, a treated and a comparable untreated element, as in Example 4 were tested side-by-side continuously for 120 hours with a 125-ppm oil emulsion. The tests were performed using the bench-scale ultrafiltration test system operated in full recirculation mode, that is, the residue and permeate streams exiting the elements were recombined in the feed tank and recirculated through the test system. These tests were conducted at a feed pressure of 60 psig and an initial permeate pressure of 40 psig. The permeate pressure was decreased as required to maintain an average permeate water flux of 40 gfd. When the permeate pressure reached atmospheric and the flux could no longer be maintained at that level, the system was turned off, the elements were backflushed to remove accumulated oil and other contaminants. The system was then put back online and the process was repeated. The performance of the treated and untreated elements is shown in FIG. 6.

As can be seen, the resistance of the untreated element was initially about 0.3 psi/gfd, and increased gradually to 2.0 psi/gfd after about 60 hours. The element was backflushed, which restored the resistance to about 1.0 psi/gfd. But, the resistance quickly increased back up to about 1.8 psi/gfd within about 10 hours. In contrast, the resistance of the treated element remained constant at about 0.7 psi/gfd throughout the duration of the test.

Example 11

Full-Scale Element Water Permeation Tests

A full-scale ceramic ultrafiltration membrane element was purchased from CeraMem (Waltham, Mass.). The element was the same material as the lab-scale elements, that is, a tubular monolith of a silica selective layer on a recrystallized silicone carbide (RSiC) support. The element was approximately 6 inches in diameter, 34 inches long, and had an effective membrane area of 10.7 m$^2$. The nominal pore size was 5 nm (50 Å).

A single treatment of a 0.1% solution of PEBAX® 1074 in n-butanol was applied and the element was allowed to dry. The treated element was installed in the module housing and was tested in a full-scale test system with pure water. The feed pressure was 40 psig, the permeate pressure was atmospheric, and the temperature was 25° C. The feed crossflow rate was 24 gpm, the feed-to-residue pressure drop was 8 psig, and the stage-cut was 16%. The pure-water flux was 100 kg/m$^2$·h (60 gfd).

Based on this test, the pure-water flux at a feed pressure of 60 psig was estimated to be 150 kg/m$^2$·h (90 gfd), which is similar to the pure-water fluxes measured with the lab-scale elements in Example 5.

Example 12

Full-Scale Element Oil/Water Mixture Tests

Figure 7:
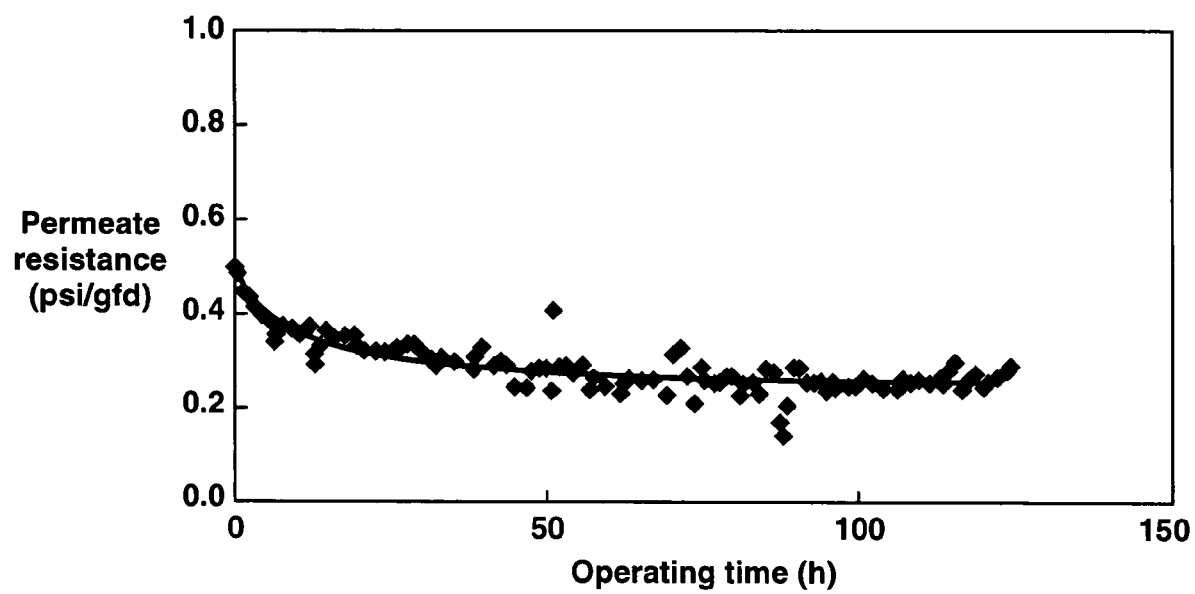
FIG. 7 is a graph showing results of a long-term permeation test with a commercial-scale treated ceramic element.

A full-scale treated element similar to that used in Example 11 was tested as in Example 10, that is, the permeate pressure was decreased as needed to maintain a constant permeate water flux. The feed pressure was 60 psig, and the initial permeate pressure was about 55 psig. In this case, however, the permeate flux remained constant throughout the duration of the experiment (120 hours) without any reduction in the permeate pressure. As can be seen in FIG. 7, the resistance was constant at about 0.3 psi/gfd, after an initial period of irregularity while the element attained steady-state operation.

I claim:

1. A membrane suitable for ultrafiltration, comprising an inorganic membrane characterized by the following elements:
  (a) before being treated as described in element (b) below, the inorganic membrane has a porous feed surface with an average pore diameter in the range 10-1,000 Å and is able to function as an ultrafiltration membrane;
  (b) the inorganic membrane has been treated by depositing an organic polymer on the porous feed surface;
  (c) after being treated as described in element (b) above, the inorganic membrane continues to be able to function as an ultrafiltration membrane but is unable to function as a solution-diffusion gas separation membrane, wherein the organic polymer forms a discontinuous deposit on the porous feed surface.

* * * * *